(12) United States Patent
Boxall et al.

(10) Patent No.: US 7,065,047 B2
(45) Date of Patent: Jun. 20, 2006

(54) SYSTEM AND METHOD OF PROVIDING COMPUTER NETWORKING

(75) Inventors: Robert Boxall, Chicago, IL (US); Emir Mulabegovic, Chicago, IL (US)

(73) Assignee: PCTEL, Inc., Chicago, IL (US)

( * ) Notice: Subject to any disclaimer, the term of this patent is extended or adjusted under 35 U.S.C. 154(b) by 808 days.

(21) Appl. No.: 09/986,484

(22) Filed: Oct. 22, 2001

(65) Prior Publication Data

US 2003/0076841 A1   Apr. 24, 2003

(51) Int. Cl.
*H04J 1/16* (2006.01)

(52) U.S. Cl. ........................ 370/230; 370/401

(58) Field of Classification Search ............... 370/230, 370/389, 393, 395.3, 395.31, 395.5, 395.52, 370/216 M, 217, 219, 220, 221, 237, 401, 370/402, 235; 709/311, 227, 225, 223, 230, 709/238, 249, 203, 219, 239, 208, 235
See application file for complete search history.

(56) References Cited

U.S. PATENT DOCUMENTS

| | | |
|---|---|---|
| 5,159,592 A | 10/1992 | Perkins |
| 5,309,437 A | 5/1994 | Perlman et al. |
| 5,371,852 A | 12/1994 | Attanasio et al. |
| 5,412,854 A | 5/1995 | Lockwood et al. |
| 5,557,748 A | 9/1996 | Norris |
| 5,586,269 A | 12/1996 | Kubo |
| 5,636,216 A | 6/1997 | Fox et al. |
| 5,708,655 A | 1/1998 | Toth et al. |
| 5,751,971 A | 5/1998 | Dobbins et al. |
| 5,781,552 A | 7/1998 | Hashimoto |
| 5,790,541 A | 8/1998 | Patrick et al. |
| 5,793,763 A | 8/1998 | Mayes et al. |
| 5,798,706 A | 8/1998 | Kraemer et al. |
| 5,841,769 A | 11/1998 | Okanoue et al. |
| 5,854,901 A | 12/1998 | Cole et al. |
| 5,862,345 A | 1/1999 | Okanoue et al. |
| 5,909,549 A | 6/1999 | Compliment et al. |
| 5,915,119 A | 6/1999 | Cone |
| 5,918,016 A | 6/1999 | Brewer et al. |
| 5,920,699 A | 7/1999 | Bare |
| 6,003,083 A * | 12/1999 | Davies et al. ............... 709/226 |
| 6,006,272 A | 12/1999 | Aravamudan et al. |
| 6,012,088 A | 1/2000 | Li et al. |
| 6,130,892 A | 10/2000 | Short et al. |
| 6,157,808 A | 12/2000 | Hollingsworth |
| 6,182,141 B1 | 1/2001 | Blum et al. ................. 709/227 |

(Continued)

FOREIGN PATENT DOCUMENTS

WO   WO 98/26548   6/1998

(Continued)

OTHER PUBLICATIONS

Cooper et al., "Web Proxy Auto-Discovery Protocol," Network Working Group, Internet Draft, Nov. 15, 2000, pp. 1-21.

(Continued)

*Primary Examiner*—Brenda Pham
(74) *Attorney, Agent, or Firm*—Welsh & Katz, Ltd.

(57) ABSTRACT

A method of bypassing proxy settings of a computing device on a network wherein the proxy settings do not correspond to the network, the method comprising the steps of receiving a request from the computing device in the form of a DNS or IP address, determining if the request is directed to a proxy server and responding to the request with the identification of a proxy server associated with the network.

3 Claims, 2 Drawing Sheets

U.S. PATENT DOCUMENTS 6,226,684 B1 * 5/2001 Sung et al. .................. 709/238
6,480,508 B1 * 11/2002 Mwikalo et al. ............ 370/475

FOREIGN PATENT DOCUMENTS

WO     WO 01/30130     5/2001

OTHER PUBLICATIONS

University Computing Service, "Using the Web Proxy Server," University of Newcastle upon Tyne, Jul. 1, 2001, pp. 1-6.

* cited by examiner

SYSTEM AND METHOD OF PROVIDING COMPUTER NETWORKING

BACKGROUND OF THE INVENTION

1. Field of the Invention

The invention relates in general to computer networks, and more particularly, to a system and method of providing wireless and wired networking between a server and a client. In general, the system and method provide for network connectivity to computers having generally incompatible network settings, without requiring user reprogramming and further allows roaming between various wireless stations. The particular focus has been on incompatible proxy settings between various networks.

2. Background Art

The use of personal computers is ever increasing. With the world wide web and with email, the need for personal computers in daily life has forced even novice computer users to become more technology driven. One area that has plagued many computer users is the navigation on an outside (unfamiliar) network. This is especially true for computers which are programmed for use in a corporation (i.e. through a proxy server).

For example, many hotels and conference centers are providing wireless and wired access to a LAN and, in turn, access to the world wide web and to email servers. While such services are often essential for business travelers, the implementation of such systems is generally difficult for users as users are generally unfamiliar with the operation and manipulation of network settings. For these reasons, many users shy away from utilizing the services provided at these facilities. Often, while current routers and hardware can handle a reconfiguration (i.e., via DHCP, etc.), proxy settings which are common in the corporate environment are generally difficult to reconfigure and often result in a failed connection to the internet in different environments.

Moreover, a facility, such as a hotel may divide the wireless capability among various areas (i.e., rooms, conference areas, lobby, etc.). In this manner the different areas can permit different access, and different charges can be applied to usage in different areas. However, roaming between the different areas has proved troublesome as this generally results in an interruption in services, and, for example temporary loss of service.

Accordingly, it is an object of the present invention to facilitate the networking of computers on a network, without requiring the reprogramming of same by a user.

It is another object of the present invention to facilitate the roaming of a wireless device across a plurality of wireless networks.

SUMMARY OF THE INVENTION

A method of bypassing proxy settings of a computing device on a network wherein the proxy settings do not correspond to the network, the method comprising the steps of receiving a request from the computing device in the form of a DNS or IP address, determining if the request is directed to a proxy server, and, responding to the request with the identification of a proxy server associated with the network.

In a preferred embodiment, the step of determining comprises the step of analyzing at least one of the user, the request and a response received by the network in response to the request.

In another preferred embodiment, the step of receiving comprises the step of receiving a DNS request, and, wherein the step of determining comprises the step of analyzing the response received by the network in response to the request. In one such embodiment, the step of responding comprises the step of providing the IP address of the proxy server associated with the network.

In another preferred embodiment, the step of responding comprises the step of redirecting the request to the proxy server associated with the network.

In yet another preferred embodiment, the method further comprises the steps of receiving a request from the computing device directed to the proxy server associated with the network, after the step of responding, and, determining the level of access to the proxy server, redirecting the computing device to a predetermined location if the level of access is determined to not include access outside of the proxy server, and, allowing the request to proceed to the proxy server associated with the network if the level of access is determined to include access outside of the proxy server.

In such an embodiment, the predetermined location comprises a site which requires a login. In another preferred embodiment, the step of redirecting further comprises the steps of requesting a login from the computing device, processing the login, and, redirecting the request to proceed to the proxy server upon successful processing.

In another aspect of the invention, the invention comprises a machine executable code for bypassing proxy settings of a computing device on a network wherein the proxy settings do not correspond to the network comprising means for receiving a request from the computing device in the form of a DNS or IP address, means for determining if the request is directed to a proxy server, and, means for responding to the request with the identification of a proxy server associated with the network.

In another aspect of the invention, the invention comprises a method of bypassing proxy settings of a computing device on a network wherein the proxy settings do not correspond to the network, the method comprising the steps of receiving a request from the computing device in the form of a DNS request, determining if the DNS request is directed to a proxy server, and, responding to the request with the IP address of a proxy server associated with the network.

In yet another aspect of the invention, the invention comprises a method of networking computers comprising the steps of providing a router having a subnet on one side of the router and access to a global network of computers on the other side of the router, the router having a subnet, establishing communication with at least one computing device on the one side of the router, wherein at least one of the at least one computing device has a subnet that does not correspond to that of the router, determining the IP address of the computing device, storing a table of IP address of computing devices which are on the one side of the router regardless of the corresponding of the subnet of the computing device and the router, and, facilitating communication to and from the computing device through the router between the one side and the other side.

BEST MODE FOR PRACTICING THE INVENTION

Figure 1:
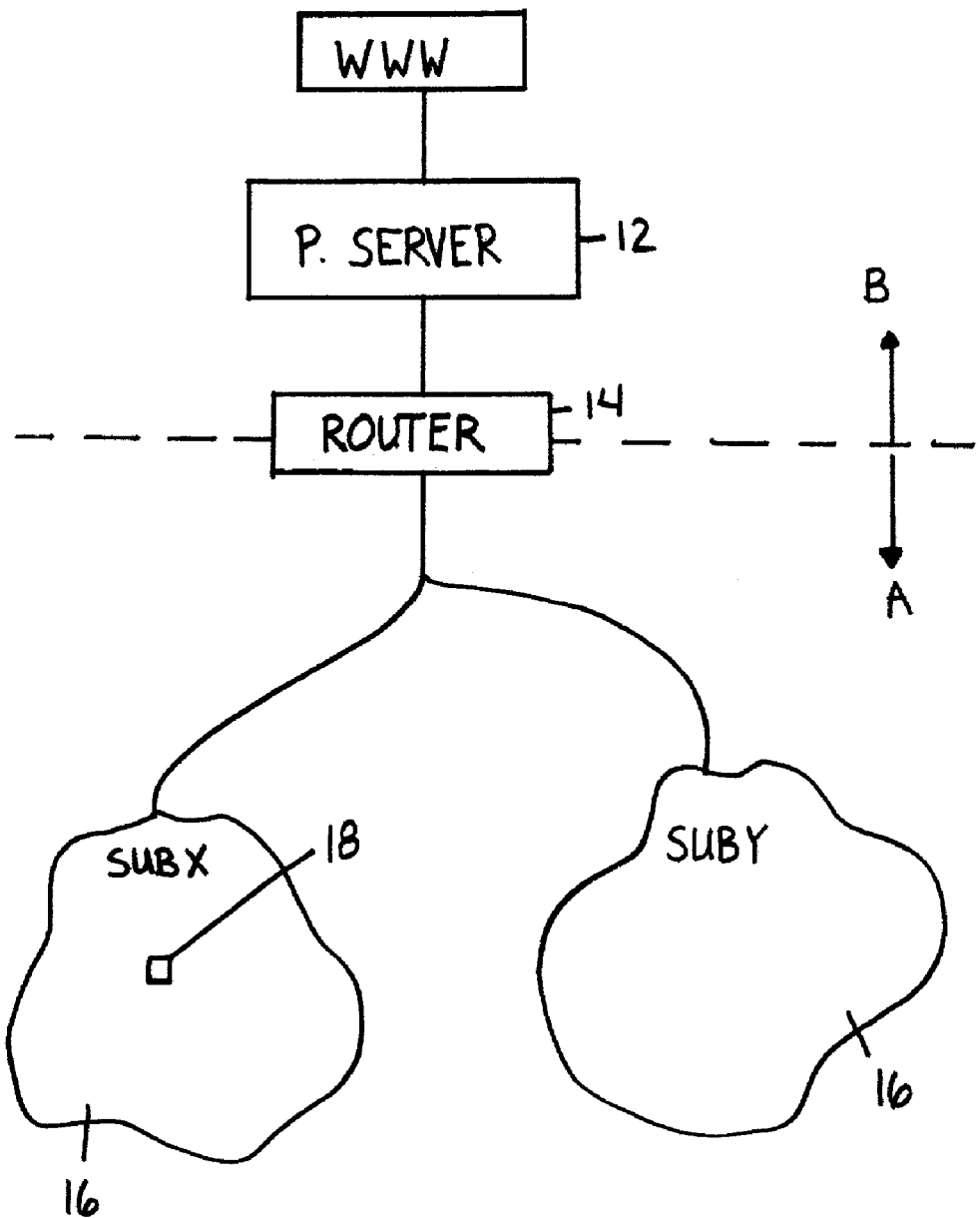
FIG. 1 of the drawings is a schematic representation of the network of the present invention.

While this invention is susceptible of embodiment in many different forms, there is shown in the drawings and will be described in detail, one specific embodiment with the understanding that the present disclosure is to be considered as an exemplification of the principles of the invention and is not intended to limit the invention to the embodiment illustrated.

Referring now to the Figures, and in particular to FIG. 1, networking system is shown generally at 10. System 10 includes server 12, router 14, subzones such as subzone 16, and computing devices, such as computing device 18. Generally, server 12, may comprise a proxy server associated with a local area network (LAN) and the world wide web (www/internet). Of course, other types of servers are likewise contemplated for use. Computing devices, such as device 18 may comprise various types of computers (desktop and laptop) running any one of the Windows operating systems (95, 98, Me, 2000, XP), MacOs, Linux. Additionally, the computing devices may comprise tablet computers, as well as PDA's operating under one any one of Linux, PalmOs, Pocket PC/WinCE.

Router 14 is in communication with each of server 12 and subzones 16. Generally these connections may comprise any one of Ethernet connections (10/100 base T) as well as DSL, T-1 and other connections utilizing TCP/IP. Generally, the connection to the www will operate as under a TCP/IP protocol. While it is contemplated that these systems will be hard wired to each other, it is likewise contemplated that the communication between these devices is accomplished through wireless means.

The subzones may comprise different domains. Further the different subzones may correspond to different areas or different floors or different buildings within an area (campus). Indeed, there is no limit to the number of subzones or the relationship between the subzones.

Each computing device 18 is in communication with a subzone. For example, the computing device is preferably associated with a subzone wirelessly, wherein it is recognized and registered onto the network when it is within range. Of course, the computing device can be selectively placed in communication through any one of wired or wireless means. Preferably, the computing device utilizes an Ethernet component (i.e., uses wireless or wired LAN card).

Generally, computing device 18 includes several layers of identification. This includes an IP address and a MAC (Media Access Control) address for its connection media. In some instances, such as when operating under DHCP (Dynamic Host Configuration Protocol), the IP address is assigned by a server or router when the computing device 18 is attached thereto. In addition to these identification layers, computing device 18 is often provided with a proxy setting which corresponds to a proxy server address of a network with which computing device 18 is generally associated. When within that network (the common network with which computing device 18 is associated), the computing device sends out requests to the proxy server which then communicates with outside computers on behalf of the computing device.

When a user enters, for example a hotel, and wishes to connect to, for example, the wireless network of the server, the system of the present invention is designed to provide access to that user regardless of the settings of the particular computing device. In particular, the computing device sends out an ARP (Address Resolution Protocol) request to a particular IP address. Generally, routers are configured under proxy ARP and respond with their MAC address regardless of the IP address that is attached to the request (i.e., the router accepts the request and respond under the assumption that future requests will pass through the router and can be directed as such).

In addition, where the computer is configured for DHCP, the router assigns the computing device an IP address from a preselected group of IP addresses (i.e. 100.100.100.23). Most computer systems (such as any Windows system, MacOS, etc.) can be configured into a DHCP configuration. Indeed, the vast majority of computers which are currently being used in wireless environments utilize DHCP. Increasingly, computers which are generally a part of a wired network likewise utilize DHCP.

Figure 2:
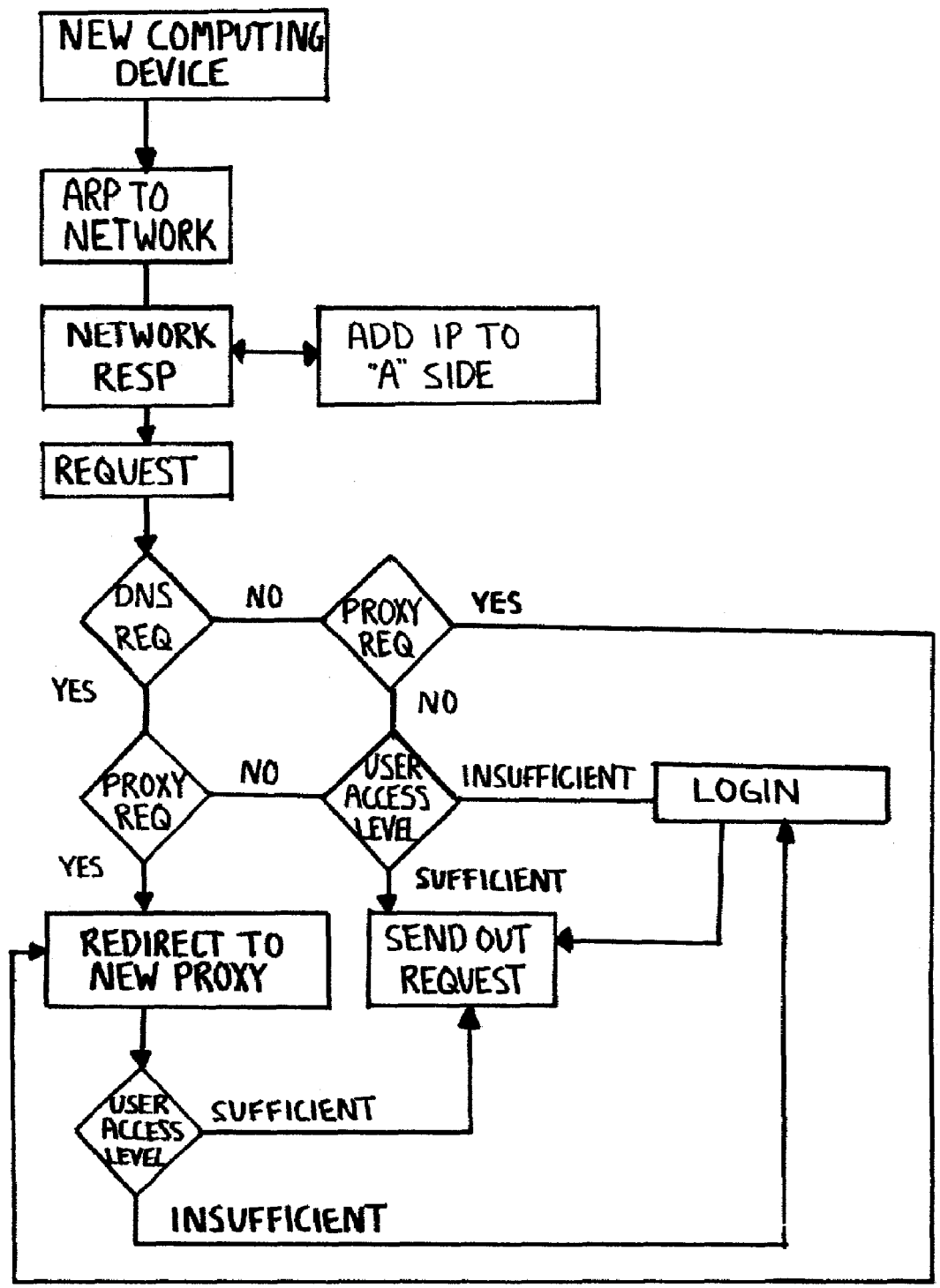
FIG. 2 of the drawings is a schematic representation of the network of the present invention, showing in particular, the means for redirecting from a first proxy server to a second proxy server.

A different situation is presented wherein the computing device is configured with a permanent IP address which pertains to settings in the commonly used network. Conceptually, the router of the present invention can maintain the entire internet on either side thereof. Conventionally, and as shown in FIG. 2, generally, the router gateway is, for example, 100.100.100.1. As such, computing devices on one side of the router, denoted as A, generally are provided with or have an address corresponding to, for example, 100.100.100.x. To the contrary, the computing devices on the other side of the router, denoted as B, correspond to the internet and have any number of IP addresses. With the present invention, the router maintains a tabulated listing of the computing devices which are on the "A" side of the router, and, as such, can communicate with a device regardless of the IP address and regardless of whether it is on the "A" or "B" side of the router.

For example, when a computing device enters the "A" side of the router with an address of, for example, 10.10.10.50, the router adds an entry to its internally maintained system that IP address 10.10.10.50 is on side "A" of the router, whereas conventionally it would be on side "B" of the router. As such, communication can be maintained with the computing device even though it appears to have an incompatible IP address, and, the computing device is capable of sending requests to the router regardless of IP address.

In any instance, general computer networks increasingly and commonly utilize NAT (Network Address Translator), to conserve IP address. In that type of situation, the IP address of the requestor computing device (regardless of the setting) will be replaced with the address of the router. Most networks utilize private IP address within the network which are replaced by a single address or a series of public IP addresses when requests are sent out from the network.

The foregoing communication between devices and acknowledgement between devices is seamless and to the user and to the computing device, there is no disruption to procedure. Next, the user may wish to connect to other devices (i.e., a website). In this instance, the computing device of the user may or may not be configured for use in association with a proxy server. As shown in FIG. 1, if the computing device is configured for use in association with a proxy server, then any request will be preceded by a request for the proxy server. For example, a DNS request can be sent by the computing device which may appear as proxy.xxx-.com where this is the name of the proxy server. The router will transmit the request, and, as the requested proxy server is not available at the remote location, the request will be returned. The router, however, will analyze the request and the user that has made the request to make a determination as to whether the user was requesting a proxy server.

Generally, while various methods and means of determining are contemplated, the following are examples: the term "proxy" appears in the request, it is the first request of the user, the user has connected previously and was reconfigured due to proxy settings, etc. In other instances, the user may have a proxy server address (i.e., not a name but an IP address) and a port number. The router is aware of commonly known port assignments for corporate and private proxies. Again, based on these commonly known port assignments, as well as other related determining means and methods, the router can make a best effort to determine if the request is a proxy request.

In certain embodiments, the TCP/IP packets can be filtered to determine http requests. This is done by pattern matching of the known possible http formatting of packets. If a packet is found that appears to be an http request, then the TCP port used by the user is found. This port is then added to the proxy as a valid proxy port for the system.

If it is determined that the request was a proxy request, then the router will return the address of the proxy server of the present network, i.e. proxy server 20 which has an address of 192.168.21.201 (or otherwise redirect the computing device to the proxy server). The computing device will then associate any proxy request with the address provided by the router (even though the address does not correspond to the requested proxy server). As such, the router can bypass the proxy settings of the user and redirect the computing device to a designated proxy, without disturbing the settings of the user. Indeed, the settings of the user remain fully intact, such that when the user returns to the conventional network with which it is commonly associated. In certain embodiments, wherein the TCP port of a user is found, the port is added to the proxy as a valid proxy port for the proxy.

Next, the computing device will transmit a proxy request to the newly provided server. The router will analyze the request and the IP address of the requester. In the event that the user has not been authorized (i.e., paid for the wireless usage), the router will not pass the request to the proxy server, rather the router will redirect the user to a login screen.

Only after the user has successfully logged into the system, the router will permit the request to be directed to the proxy server, so that the proxy server can pass the request. Further requests will be permitted to proceed directly to the proxy server, as the computing device has already been established on the system.

As the user transgresses through different wireless nodes within the system, as the computing device's IP address remains the same (as does the device MAC address), and as the router is operating under NAT, the computing device remains accessible at any time. For example, a download will not be interrupted merely because a user transgresses through different wireless nodes within a system. Moreover, as the router can determine with which node the user is associated, the router can maintain different charges pertaining to different nodes (i.e. different locations within a system).

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A method of bypassing proxy settings of a computing device on a network wherein the proxy settings do not correspond to the network, the method comprising the steps of:
   receiving a request from the computing device in the form of a DNS or IP address;
   determining if the request is directed to a proxy server;
   responding to the request with the identification of a proxy server associated with the network;
   receiving a request from the computing device directed to the proxy server associated with the network, after the step of responding; and
   determining the level of access to the proxy server;
   redirecting the computing device to a predetermined location if the level of access is determined to not include access outside of the proxy server; and
   allowing the request to proceed to the proxy server associated with the network if the level of access is determined to include access outside of the proxy server.

2. The method of claim 1 wherein the predetermined location comprises a site which requires a login.

3. The method of claim 1 wherein the step of redirecting further comprises the steps of:
   requesting a login from the computing device;
   processing the login; and
   redirecting the request to proceed to the proxy server upon successful processing.

* * * * *

UNITED STATES PATENT AND TRADEMARK OFFICE
CERTIFICATE OF CORRECTION

PATENT NO. : 7,065,047 B2
APPLICATION NO. : 09/986484
DATED : June 20, 2006
INVENTOR(S) : Robert Boxall and Emir Mulabegovic It is certified that error appears in the above-identified patent and that said Letters Patent is hereby corrected as shown below:

Title page Item [56]
References Cited,
Delete "5,412,854 A 5/1995 Lockwood et al." to Insert --5,412,654 A 5/1995 Perkins --.

Other Publications,
Add -- Egevang, et al., "The IP Network Address Translator," Network Working Group RFC 1631, May 1994, pp. 1-9 --.

Signed and Sealed this

Sixth Day of March, 2007

JON W. DUDAS
*Director of the United States Patent and Trademark Office*